United States Patent

Dittly et al.

(10) Patent No.: US 8,128,128 B2
(45) Date of Patent: Mar. 6, 2012

(54) SKIVED MANIFOLD COUPLER

(75) Inventors: Bruce W. Dittly, North Tonawanda, NY (US); Don C. Corser, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 235 days.

(21) Appl. No.: 12/635,734

(22) Filed: Dec. 11, 2009

(65) Prior Publication Data

US 2011/0140413 A1   Jun. 16, 2011

(51) Int. Cl.
*F16L 41/00* (2006.01)
(52) U.S. Cl. ....................................................... 285/197
(58) Field of Classification Search .................. 285/197, 285/198, 199, 206, 205, 208
See application file for complete search history.

(56) References Cited

U.S. PATENT DOCUMENTS

| | | | |
|---|---|---|---|
| 1,570,887 A * | 1/1926 | Graves .......................... | 285/197 |
| 2,788,232 A | 6/1954 | Stadthaus | |
| 3,649,055 A | 3/1972 | Nilsen | |
| 4,107,454 A * | 8/1978 | Jakobsen ...................... | 285/197 |
| 4,613,171 A * | 9/1986 | Corcoran ...................... | 285/197 |
| 4,789,189 A * | 12/1988 | Robertson ..................... | 285/197 |
| 5,280,971 A * | 1/1994 | Tokutake et al. ............. | 285/197 |
| 5,509,473 A * | 4/1996 | Tokutake ....................... | 285/197 |
| 6,412,824 B2 * | 7/2002 | Kunsman ...................... | 285/197 |

* cited by examiner

*Primary Examiner* — David E Bochna
(74) *Attorney, Agent, or Firm* — James M. Chan

(57) ABSTRACT

A coupling of a heat exchanger includes a saddle for engaging a cylindrical manifold. The saddle has an arcuate cross-section extending between a first edge and a second edge. The saddle defines an opening and a tubular member extends through the saddle and between a top edge and a bottom edge. A lip extends outward from the top edge and a skirt interconnects the lip to the opening in the saddle. The tubular member is oblong-shaped adjacent the opening of the saddle and the tubular member has an oblong-shaped portion extending from the bottom edge to adjacent the opening in the saddle and terminating at a transition zone. The tubular member has a circular-shaped portion extending from the transition zone to the top edge. The oblong-shaped portion has a shorter dimension in the direction between the first and second edges than the circular shaped portion.

9 Claims, 3 Drawing Sheets

ND COUPLER

BACKGROUND OF THE INVENTION

1. Field of the Invention

A coupling for a manifold of a heat exchanger

2. Description of the Prior Art

Couplings of the type that are fitted into in holes of manifolds of heat exchangers for accepting and supporting pipes and hoses thereto are well-known in the prior art. The U.S. Pat. No. 3,649,055 to Nilsen discloses a coupling having a saddle extending between a first edge and a second edge and extending between side edges and defining an opening. A tubular member presenting a passage surrounding a center axis is disposed in the opening and extends between a top edge and a bottom edge.

The U.S. Pat. No. 2,788,232 to Stadthaus discloses a coupling having a lip extending outward from the top edge of a tubular member and a skirt interconnecting the lip with the opening of a saddle.

SUMMARY OF THE INVENTION

The invention provides such a coupling wherein the tubular member is oblong-shaped adjacent the opening of the saddle.

ADVANTAGES OF THE INVENTION

The invention decreases wear to the arbor used in punching the manifold hole corresponding to and receiving the coupling.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
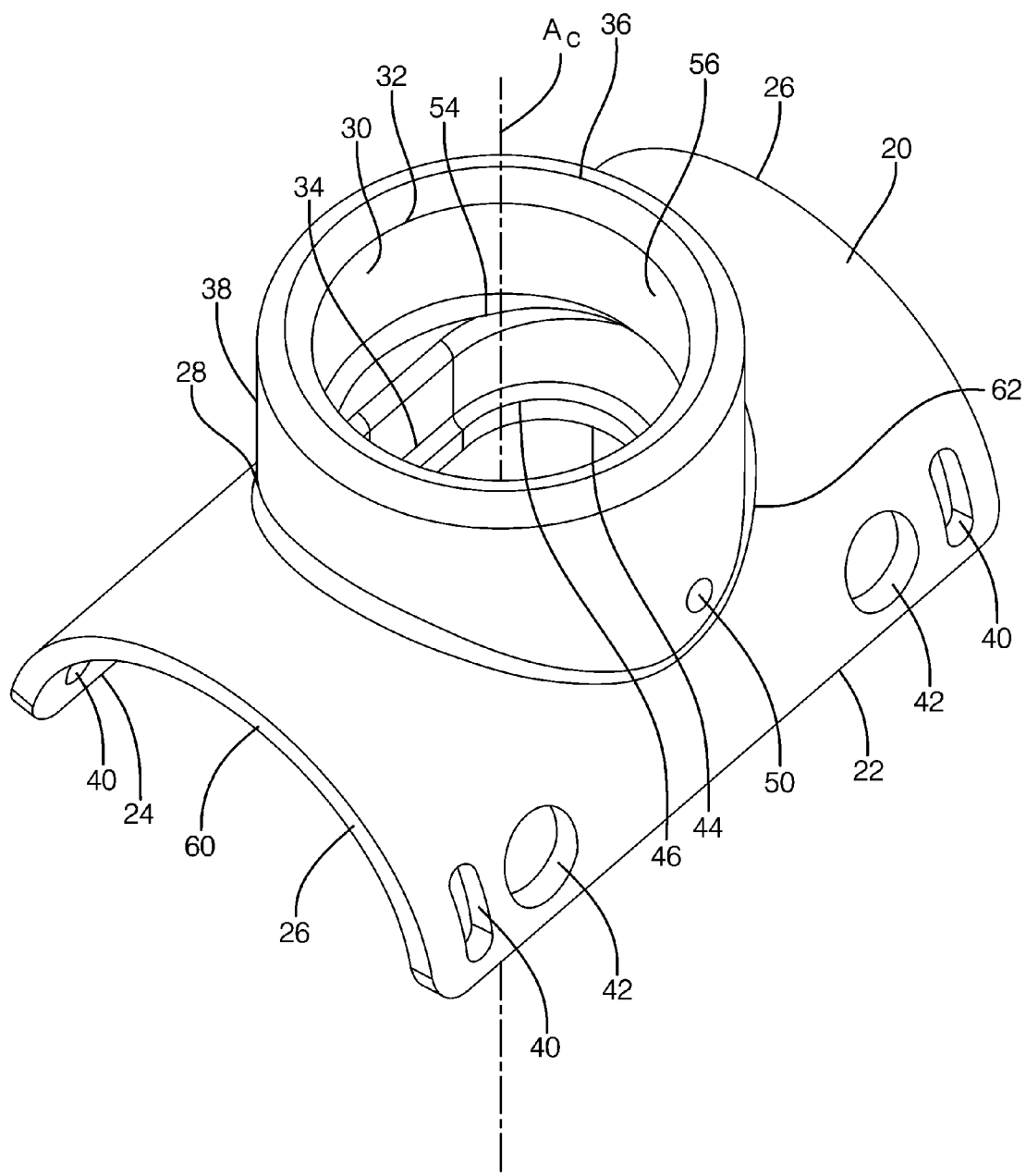
FIG. 1 is top perspective view of a coupling in accordance with the invention.
Figure 2:
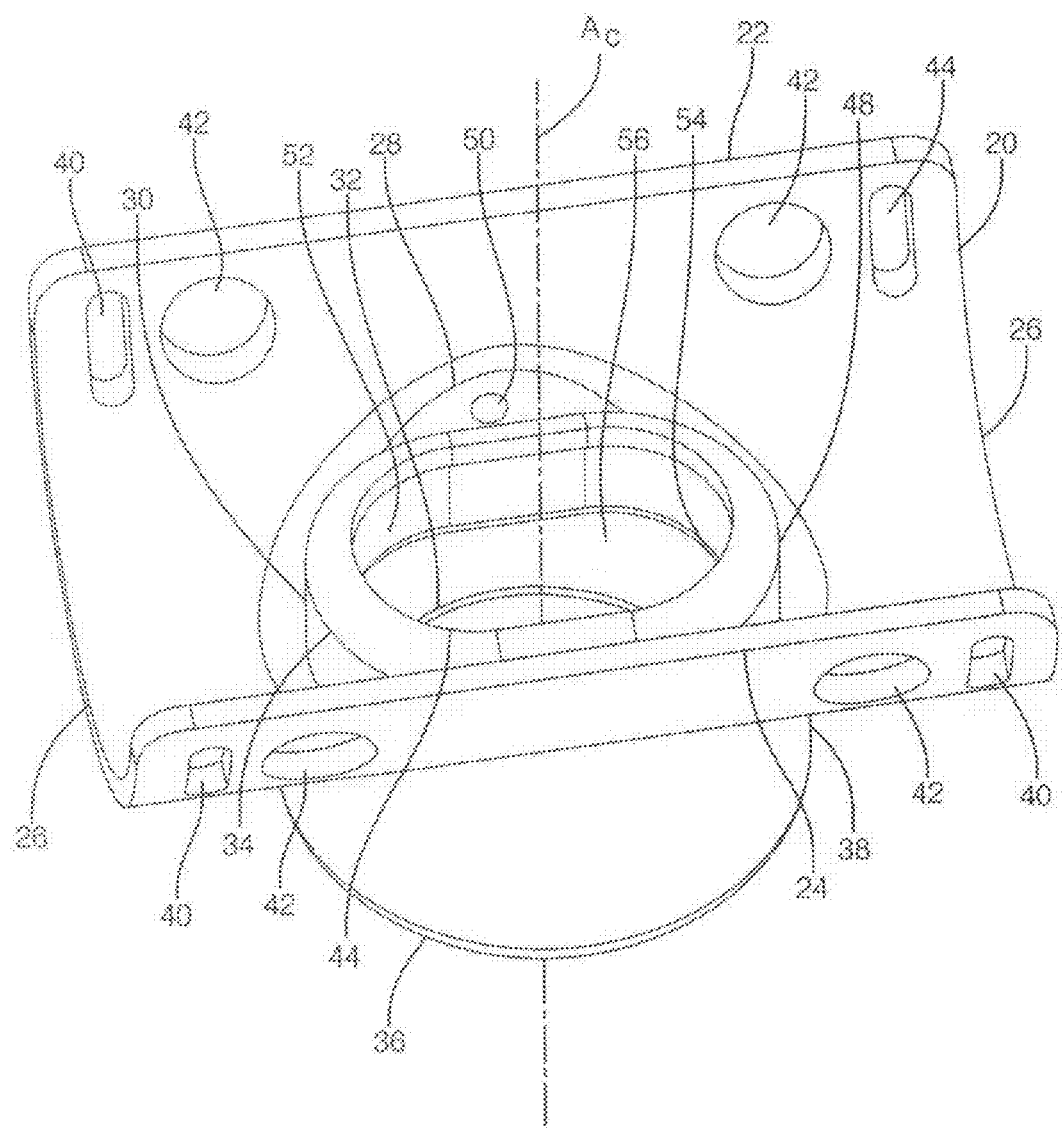
FIG. 2 is a bottom perspective view of a coupling in accordance with the subject invention.
Figure 3:
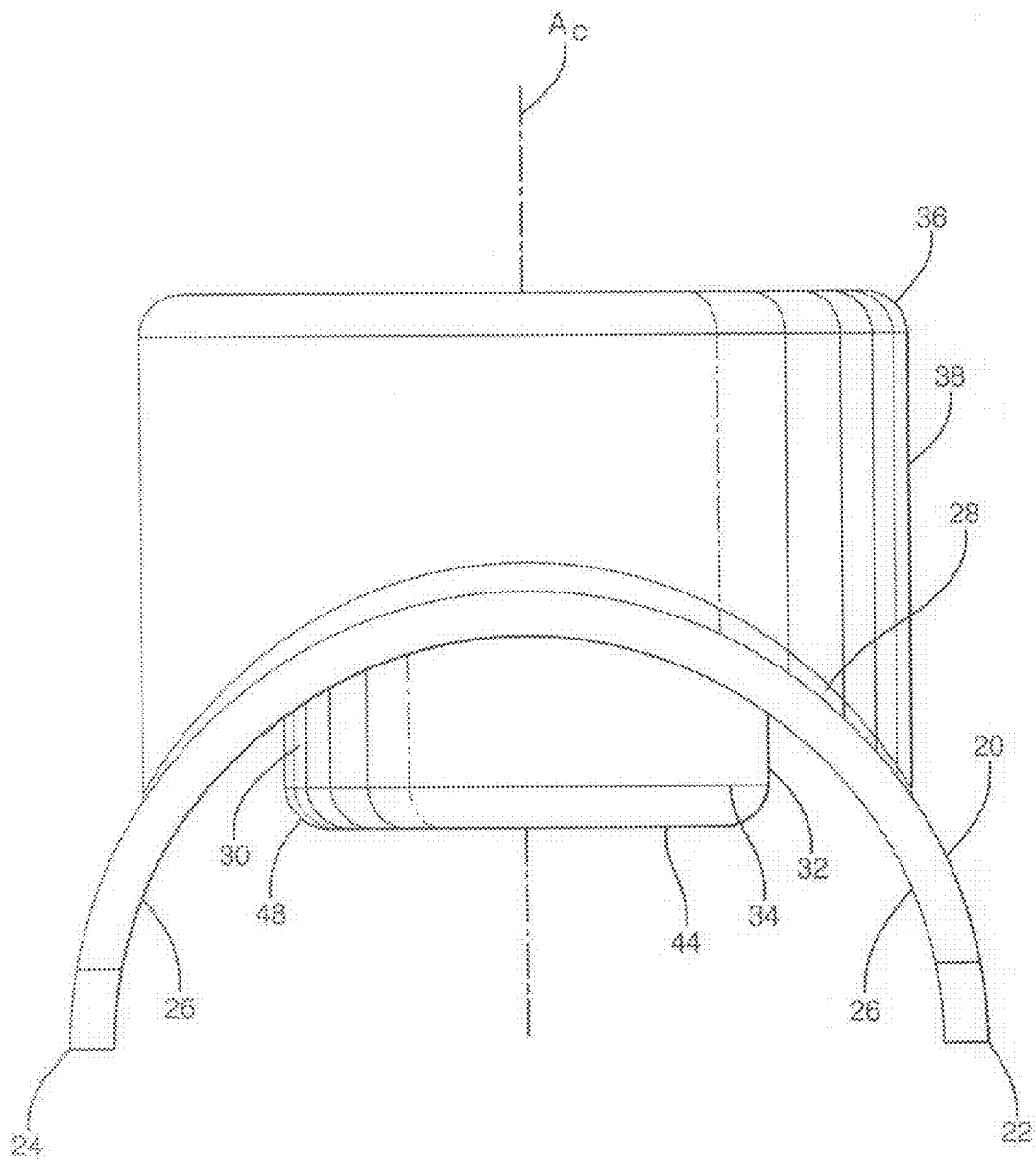
FIG. 3 is a profile view of a coupling in accordance with the subject invention.

Referring to the Figures, wherein like numerals indicate corresponding parts throughout the several views, a coupling of a heat exchanger includes a saddle 20 for engaging a cylindrical-type manifold. The saddle 20 has an arcuate cross-section 60 extending in a circular arch between a first edge 22 and a second edge 24 and extends longitudinally between a pair of side edges 26. The saddle 20 defines an opening 28 having a saddle-shaped periphery 62. A tubular member 30 presents a passage and surrounds a center axis $A_C$ and extends radially through the saddle 20 and between a top edge 32 and a bottom edge 34. The top edge is radially outward from the saddle and the bottom edge is radially inward of the saddle. The tubular member 30 has a circular cross-section perpendicular to the center axis $A_C$ at the top edge 32.

A lip 36 extends in a semi-circular shape outward from the top edge 32 away from the tubular member 30. A skirt 38 shorter than the tubular member 30, interconnects the opening 28 in the saddle 20 to an intersection with the lip 36. The skirt 38 is parallel and concentric with the tubular member 30. The skirt 38 defines a sniffer hole 50 extending therethrough adjacent the saddle 20.

The saddle 20 defines a plurality of securing holes 40 each having an oblong shape and a plurality of round holes 42 each having a circular shape. The securing holes 40 have a greater dimension in the direction between the side edges 26 than the dimension in the direction between the first edge 22 and the second edge 24.

One of the securing holes 40 is disposed at each of the side edges 26 adjacent the first edge 22. One of the securing holes 40 is disposed at each of the side edges 26 adjacent the second edge 24. One of the round holes 42 is disposed adjacent to each of the securing holes 40 and opposite of the side edges 26 to the securing holes 40.

The tubular member 30 presents a stop 44 disposed within the passage and extending therefrom radially inward toward the center axis $A_C$. The stop 44 is flange-like and includes an upper flat surface 46 extending from the bottom edge 34 of the tubular member 30 and a lower curved surface 48 opposite the upper flat surface 46 curving away from said bottom edge 34 toward the center axis $A_C$.

The invention is characterized by the tubular member 30 being oblong-shaped adjacent the opening in the saddle. The tubular member includes an oblong-shaped portion 52 extending from the bottom edge 34 of the tubular member to adjacent the opening 28 in the saddle 20 and terminating at a transition zone 54. The tubular member 30 includes a circular-shaped portion 56 extending from the transition zone 54 to the top edge 32.

The oblong-shaped portion 52 has a shorter dimension in the direction between the first edge 22 and the second edge 24 than the circular-shaped portion 56. The oblong-shaped portion 52 has a longer dimension in the direction between the first edge 22 and the second edge 24 than in the direction between the side edges 26.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coupling for a manifold of a heat exchanger comprising:
    a saddle extending between a first edge and a second edge and extending between side edges and defining an opening,
    a tubular member presenting a passage surrounding a center axis and extending through said opening and between a top edge and a bottom edge,
    a lip extending outward from said top edge, and
    a skirt interconnecting said lip and said opening,
    wherein said tubular member being oblong-shaped adjacent said opening in said saddle,
    wherein said oblong-shaped portion has a shorter dimension in the direction between said first and second edges than said circular-shaped portion and said oblong-shaped portion has a shorter dimension in the direction between said first and second edges than in the direction between said side edges.

2. A coupling for a manifold of a heat exchanger comprising:
- a saddle extending between a first edge and a second edge and extending between side edges and defining an opening,
- a tubular member presenting a passage surrounding a center axis and extending through said opening and between a top edge and a bottom edge,
- a lip extending outward from said top edge, and
- a skirt interconnecting said lip and said opening,
- wherein said tubular member being oblong-shaped adjacent said opening in said saddle,
- wherein said tubular member presents a stop extending from said bottom edge of said tubular member radially inward toward said center axis, and
- wherein said stop is a flange having an upper flat surface extending from said bottom edge of said tubular member and a curved surface opposite said upper flat surface curving away from said bottom edge and toward said center axis.

3. A coupling for a manifold of a heat exchanger comprising:
- a saddle extending between a first edge and a second edge and extending between side edges and defining an opening,
- a tubular member presenting a passage surrounding a center axis and extending through said opening and between a top edge and a bottom edge,
- a lip extending outward from said top edge, and
- a skirt interconnecting said lip and said opening,
- wherein said tubular member being oblong-shaped adjacent said opening in said saddle,
- wherein said skirt defines a sniffer hole extending therethrough adjacent said saddle.

4. A coupling for a manifold of a heat exchanger comprising:
- a saddle extending between a first edge and a second edge and extending between side edges and defining an opening,
- a tubular member presenting a passage surrounding a center axis and extending through said opening and between a top edge and a bottom edge,
- a lip extending outward from said top edge, and
- a skirt interconnecting said lip and said opening,
- wherein said tubular member being oblong-shaped adjacent said opening in said saddle, and
- wherein said saddle has an arcuate cross-section extending in a circular arch between said first edge and said second edge and extending longitudinally between said side edges and said opening has a saddle-shaped periphery and said top edge being radially outward from said saddle and said bottom edge being radially inward from said saddle.

5. A coupling for a manifold of a heat exchanger comprising:
- a saddle extending between a first edge and a second edge and extending between side edges and defining an opening,
- a tubular member presenting a passage surrounding a center axis and extending through said opening and between a top edge and a bottom edge,
- a lip extending outward from said top edge, and
- a skirt interconnecting said lip and said opening,
- wherein said tubular member being oblong-shaped adjacent said opening in said saddle, and
- wherein said saddle defines a plurality of securing holes each having an oblong shape and a plurality of round holes each having a circular shape.

6. A coupling as set forth in claim 5 wherein said securing holes have a greater dimension in the direction between said first edge and said second edge than the dimension in the direction between said side edges.

7. A coupling as set forth in claim 5 wherein one of said securing holes is disposed at each of said side edges adjacent said first edge and one of said securing holes is disposed at each of said side edges adjacent said second edge and one of said round holes is disposed adjacent to each of said securing holes being opposite of said side edges to said securing holes.

8. A coupling for a manifold of a heat exchanger comprising:
- a saddle extending between a first edge and a second edge and extending between side edges and defining an opening,
- a tubular member presenting a passage surrounding a center axis and extending through said opening and between a top edge and a bottom edge,
- a lip extending outward from said top edge, and
- a skirt interconnecting said lip and said opening,
- wherein said tubular member being oblong-shaped adjacent said opening in said saddle, and
- wherein said skirt is shorter than said tubular member and is parallel and concentric with said tubular member.

9. A coupling for a manifold of a heat exchanger comprising:
- a saddle for engaging a cylindrical manifold and having an arcuate cross-section extending in a circular arch between a first edge and a second edge and extending longitudinally between a pair of side edges and defining an opening having a saddle-shaped periphery,
- a tubular member presenting a passage surrounding a center axis extending radially through said opening of said saddle and between a top edge being radially outward from said saddle and a bottom edge being radially inward of said saddle and having a circular cross-section at said top edge,
- a lip extending in a semi-circular shape outward from said top edge away from said tubular member,
- a skirt shorter than said tubular member interconnecting said opening of said saddle to an intersection with said lip and being parallel and concentric with said tubular member,
- said skirt defines a sniffer hole extending therethrough adjacent said saddle,
- said saddle defining a plurality of securing holes each having an oblong shape and a plurality of round holes each having a circular shape,
- said securing holes having a greater dimension in the direction between said first edge and said second edge than the dimension in the direction between said side edges,
- one of said securing holes being disposed at each of said side edges adjacent said first edge and one of said securing holes is disposed at each of said side edges adjacent said second edge and one of said round holes is disposed adjacent to each of said securing holes being opposite of said side edges to said securing holes, said tubular member presenting a stop disposed within said passage and extending therefrom radially inward toward said center axis is a flange including an upper flat surface extending from said bottom edge of said tubular member and a lower curved surface opposite said upper flat surface curving away from said bottom edge and toward said center axis, said tubular member being oblong-shaped adjacent said opening of said saddle and having an oblong-shaped portion extending from said bottom edge to adjacent said opening and terminating in a transition zone and said tubular member having a circular-shaped portion extending from said transition zone to said top edge, said oblong-shaped portion having a shorter dimension in the direction between said first and second edges than said circular-shaped portion, and said oblong-shaped portion having a shorter dimension in the direction between said first and second edges than in the direction between said side edges.

* * * * *